June 18, 1963 P. PATRIARCHE 3,094,150
MANUFACTURE OF GRIDS FOR ELECTRONIC TUBES
Filed June 18, 1959 2 Sheets-Sheet 1

INVENTOR:
PIERRE PATRIARCHE,
BY *Robert J. Mooney*
HIS ATTORNEY.

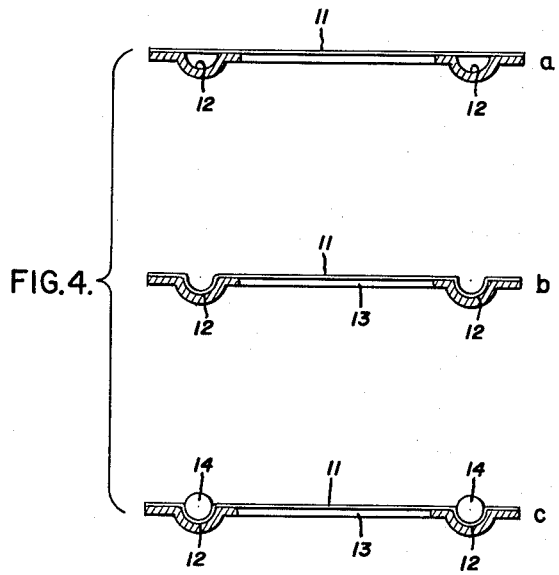
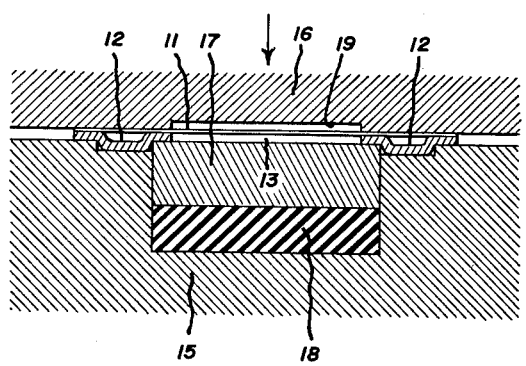

United States Patent Office 3,094,150
Patented June 18, 1963

3,094,150
MANUFACTURE OF GRIDS FOR
ELECTRONIC TUBES
Pierre Patriarche, Courbevoie, France, assignor to Compagnie Industrielle Francaise des Tubes Electroniques, Courbevoie, France
Filed June 18, 1959, Ser. No. 821,168
Claims priority, application France July 29, 1958
4 Claims. (Cl. 140—71.5)

The present invention concerns the manufacture of electron tube grids, and particularly, grids capable of being rigorously aligned in beam power tubes.

A condition necessary for such grids to be rigorously aligned is that, besides having the same spacing or pitch, the grid wires have the same slope with respect to a given reference plane, as for example, that of the insulating spacers which support the grids.

But this last condition cannot be satisfied in the winding of grids in conventional machines, since the winding of the wire is done at the same pitch on mandrels of different circumference for the different types of grids of a multigrid tube. Consequently the aforementioned slope (ratio of pitch to circumference of a helix) is different for these different grids, which makes it impossible to obtain the desired alignment without the use of later corrections.

Some arrangements have been proposed for effecting such corrections before mounting; but they have turned out to require precise adjustment and to be difficult to use.

Also, some machines have been constructed for fabricating such grids starting with a sheet of parallel, equidistant wire, crossing orthogonally the wires intended as supports for said grids. The aforementioned conditions are then precisely satisfied; i.e. constant pitch and equal slope (since the slope is zero in this particular case).

But, this principle requires that the grid wires be wound from a multiplicity of spools (one for each grid wire), so that the number of spools required may be several tens.

Such machines are necessarily complex and consequently costly.

This system can be simplified, according to the present invention, by using only a single spool to make a sheet of equidistant wires by winding onto a cylinder at the desired pitch the wire drawn from this spool: one obtains thus a sheet which obviously has limited length (equal to the circumference of the cylinder), but which is always developable.

Following this procedure, one can obtain from this sheet a series of adjacent grids by attaching the wires to support elements mounted along generatrices, the grids then being separated by cutting apart after unrolling the strip which is thus obtained. Depending on the spacing given to the support elements, one obtains grids of different widths, but always of the same pitch and the same slope, and which are therefore capable, as has been stated, of making rigorously alignable grids for beam power tubes.

Two arrangements for assembly of the support elements can be envisaged: the first consisting of placing these elements, at the desired interval, directly on the cylinder, before winding the sheet, the second consisting of effecting this placement at the same interval on the sheet itself, after the winding of the latter.

In the first arrangement, which is that commonly met on conventional winding mandrels, the attachment of the support elements to the grid wires can be effected by staking, or by electric resistance welding.

In the second arrangement, the only possible attachment is effected by electric resistance welding.

I have found that the method of attachment associated with the second arrangement above mentioned is particularly favorable for obtaining grids which must have their wires rigorously parallel. Indeed, in the conventional solution previously cited, which involves the first arrangement of electric resistance welding on a mandrel, the grid wires, abruptly heated at the instant of welding, undergo an elongation and after cooling retain a residual elongation, which can be very different from one strand of wire to another. In contrast, in the second arrangement, the grid wire, which is placed in excellent contact with the cylinder, because of the normal force (equal to $T/R$ where T designates the tension of the wire and R the radius of the cylinder) applied to it at all points, transmits its heat immediately to the cylinder itself, which is constructed of metal of good thermal conductivity and having a rather high thermal capacity; thus the strands of grid wire undergo no elongation at the instant of welding, and consequently exhibit no residual elongation.

There is obtained thus, after welding, a rigorous parallelism of the grid wires, a parallelism which is conserved through all the subsequent operations of stretching, extension, bending to shape, etc., while at the same time insuring great mechanical precision of these operations since all the strands present an identical length, and the only stretching which could result from these operations is constant from one strand to the next.

It is this second grid fabricating arrangement, characterized by the prior placement of the sheet of wires directly on the cylinder, associated with electric resistance welding, which is a principal object of the present invention, suitable as well for the fabrication of frame-grids as for that of conventional grids on supports.

The order of operations of fabrication is then the following:

The grid wire is wound on a hollow cylinder of copper, copper-chrome, or copper-tungsten, using a suitable spool-like arrangement which assures that during the winding of the wire, a controllable tension T is applied, the wire being anchored at the beginning and end of the winding operation.

The cylinder thus covered with a sheet of wires is next placed on a welding machine, its inner surface resting on the lower current-supplying electrode of the machine, which electrode has a curvature complementary to that of the cylinder, in such manner that the best possible electrical contact is realized.

Any suitable conventional arrangement may be employed to assure the correct placement of the sheet under the upper working electrode of the welder, at the desired weld-spacing depending on the type of grid desired.

In the case of grids on support wires, one can obviously, as is well known bring two support-wires belonging to adjacent grids under the working electrode, these wires being drawn parallel from two spools and simultaneously straightened.

It is advantageous to use supports which have been previously straightened, made of bars of sufficient length and fed from a magazine. Such elements, round or flat, can have been previously put in place, this measure assuring a rigid attachment to the spacers of grids so constructed by permitting a tight fit of the supports in openings in the spacers.

In the case of grids on frames, the supporting frames made of a thin layer of metal, form a continuous strip, each frame having a window bounded laterally by two parallel, longitudinal ribs formed by stamping. The welding is effected for each frame along two lines parallel to the ribs, but outside of them, the reason for this being explained later.

The process of welding is the following: the aforementioned strip is brought horizontally tangent to the sheet of grid wires underneath the work electrode so that the first weld line is made. It is then evident the rotation of the cylinder supporting the sheet, through elementary angles corresponding to the spacing between successive weld lines, will bring the strip into mating contact around the circumference of the cylinder, until the strip has been wrapped over the entire sheet of grid wires.

After cutting this cylindrical strip, there is obtained a developed strip which is ribbed and opened, on which are stretched straight, parallel grid wires welded at regular intervals. These wires cross the hollows formed in the ribs. The corresponding portions of the wires are then pressed into the hollow of the rib by a pressing action, thus giving them a permanent deformation which results in a controllable excess tension of their working length, from edge to edge of the frame, while at the same time making the wires coplanar with the other parts of the frame.

The pressing can eventually be effected with interposition between the wires stretched on the frame and the punch, of rods of metal that the punch forces into the rib hollows, wedging the grid wires and placing them under tension. Two weld points are then effected at the extremities of the rods on the frame, outside the sheet of wires.

A preferable solution for stretching the grid wire consists, in place of pressing to cause a permanent deformation of the wire, of effecting a permanent deformation of the ribs by a limited crushing of the ribs, controlling the latter, which causes the lateral portions of the frame to which the grid wires are welded to spread in parallel fashion one from the other toward the outside.

This limited crushing of the ribs suffices in effect to assure the proper tension of the wires, the ribs, in their final state, still supplying to the frame the necessary rigidity.

Any other solution known for putting tension on the grid wires by deformation of the frame can obviously be applied in accordance with the contemplation of the present invention.

After this operation of applying tension to the wires, the frames are separated by a cutting die, successively in the case of plain grids, and by pairs in the case of double grids, which are then formed by folding.

The wrapping of the strip of frames on the sheet of wires can be along a helix of the same pitch as the grid, such that the edges of the strip fall parallel to the wires at a controlled distance from them. The positioning of the strip along a helix is assured with the use of small insulating studs let into the cylinder, the strip permitting each frame to have corresponding openings, coming from the cutting.

Frame-grids so made are characterized by the parallelism of the grid wires to the base of the frame, as well as by the perfectly controlled distance from the first and from the last wire to the edges: this makes possible, in assembly, a rigorous alignment of such grids.

As for grids on supports, the strip of grid obtained after welding all the supports is sectioned into single grids, an expansion mandrel giving to these grids a controlled separation of the supports, and a convenient wire tension, as in the case of conventional grids. This mandrel operation even permits the obtaining of orthogonality of the grid wires to the mounting supports, even though this condition is not necessary for grid alignment, as it suffices, as has been previously stated, that all the wires have the same slope.

The invention will be better understood by referring to the annexed drawings.

FIGURES 1 and 2 refer respectively in elevation and in section to a schematic view of the arrangement described in the case of the realization of supported grids.

FIGURE 4 represents transverse sections of a frame grid after welding.

FIGURE 5 represents an arrangement alternate to FIGURE 4 for tensioning the wire after welding.

Figure 1:
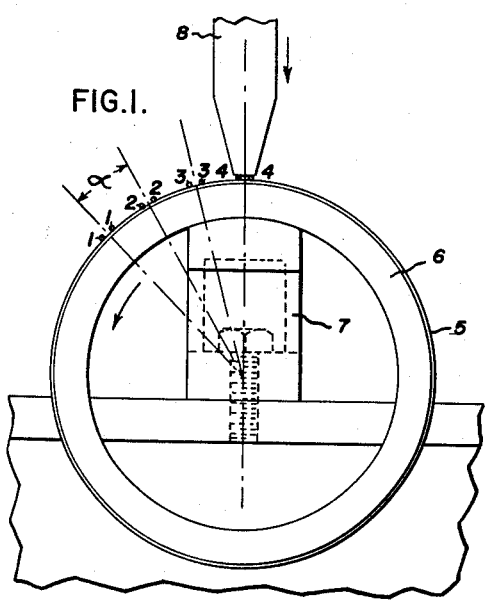
Figure 2:
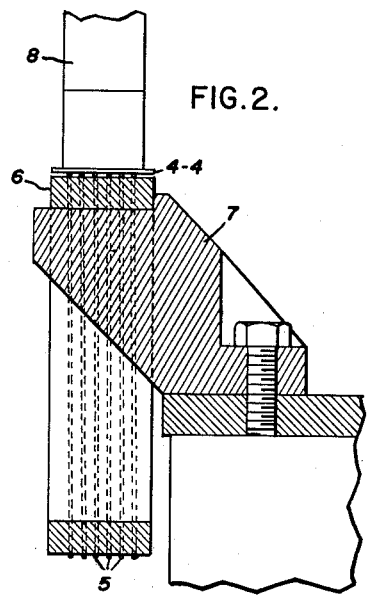

In FIGURES 1, 2, corresponding supports of adjacent grids 1—1, 2—2, 3—3 have been already loaded in contact with the sheet of grid wires 5, parallel to generatrices of the cylinder, and welded, the supports 4—4, being shown in the act of being welded. The sheet supporting cylinder 6 rests on the lower electrode 7 of the welding machine.

In being lowered, the upper welding electrode 8 presses the two supports 4—4 on the wires of the sheet and the welding is accomplished, simultaneously for all the wires of the sheet in contact with the supports 4—4. After each welding, the cylinder is turned through the angle α spanned by two consecutive weld lines.

Figure 3:
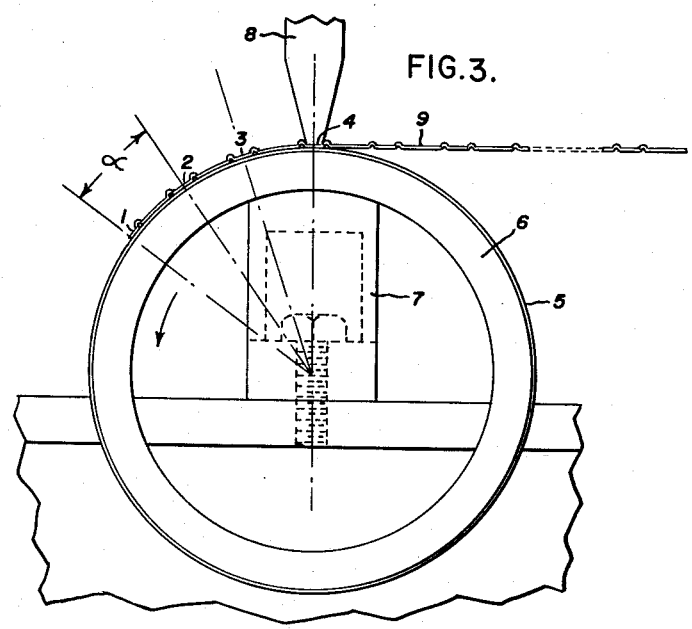
FIGURE 3 represents in elevation the same arrangement in the case of grids mounted on frames.

In the manufacture of frame grids depicted in FIGURE 3, the strip 9 having already been welded to all the wires of the sheet at 1, the rotation of the cylinder in the sense of the arrow by the angle α spanned between two successive weld lines has allowed the welding of lines 2 and 3, line 4 being in the course of welding. The operation is continued up to the line which corresponds to the welding of the extremity of the length of strip which it is possible to wind on the cylinder and which just closes on 1.

The frame grid shown in FIGURE 4 has been obtained with the preceding arrangement; in "a" it is seen just after the end of the preceding operation (the grid wire 11 being stretched across the rib hollow 12); in "b" after the pressing which, in pressing the wire into the hollows 12, assures the correct tension of the wires 11 in the window 13 of the frame and the final shape of the latter (the frame); and in "c," also after pressing, but with the addition of the metal retainers 14 which force the wires into the bottom of the ribs.

In FIGURE 5, a frame grid is shown after a permanent stretching in width, toward the outside of the ribs 12, by limited crushing of part by a relieved die 15 through the punch 16 and of the other part by a floating piece 17 mounted elastically in the die, for example on rubber 18, which, fitting very exactly the interior of the ribs, hinders the metal of the latter from flowing towards the interior of the frame. The die 16 also presents a damper 19 across the window of the frame, in order to avoid any sticking of the grid wires while they are stretched.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. In a method of making alignable grids for beam power tubes and the like the steps comprising drawing a wire from a supply spool, winding the wire onto a cylinder of good thermal conductivity and capacity in heat transferring contact therewith and in a helix having a desired pitch, placing in contact with the exterior of the wire helix a metallic supporting frame having a window area across which portions of the wire helix extend, welding the frame to the wires in contact therewith, and simultaneously maintaining the temperatures of said wires constant whereby heat elongation of said wire during welding is minimized by heat transfer to said cylinder, removing from the cylinder the frame together with the portions of said wire secured thereto, and deforming the frame to place the wire segments secured thereto in tension.

2. Apparatus for making alignable grids for electronic discharge devices, comprising means for drawing a wire from a supply spool, a cylinder of relatively high thermal conductivity and capacity, means for winding the wire under tension onto said cylinder in a helix, a supply of support frames of sheet material in strip form, said frames having windows defined by members having parallel longitudinal ribs, means for placing said support frames in contact with the exterior of the wire helix, means for electrically welding the frame to the wires along two lines parallel to and outside of the ribs, means for removing the support frame together with the portions of the wires secured thereto, means for placing the portions of the wires extending thereacross into the hollows of the ribs, thereby to increase the tension of the wires, and rod means disposed within said hollows for securing the wires in the hollows of the ribs.

3. Apparatus for making frame grids comprising means for drawing a wire from a spool, a hollow cylinder of relatively high thermal conductivity and capacity, means for winding the wire onto said cylinder in a helix having a desired pitch, source of supporting frames of sheet material, said frames having windows bounded laterally by a pair of parallel longitudinal ribs disposed on spaced coplanar surfaces of said frames, means for placing said frames in contact with the exterior of the wire helix and for electrically welding the frames to the wires along two lines parallel to and outside of the ribs, and means for partially flattening the ribs, whereby to increase the lateral spacing of the weld lines on the frame and to thereby increase the tension of the wire segments secured thereto.

4. The apparatus as defined in claim 3 wherein said cylinder is rotatable, and said electrical-welding means comprises a pair of electrodes, one said electrode being relatively stationary and disposed within the hollow of said cylinder and in sliding contact with said cylinder, the other electrode being disposed externally of said cylinder and translatable toward said cylinder and in axial alinement with said one electrode.

References Cited in the file of this patent

UNITED STATES PATENTS

| | | |
|---|---|---|
| 1,934,097 | Simon | Nov. 7, 1933 |
| 2,171,225 | Schade | Aug. 29, 1939 |
| 2,507,709 | Gronros | May 16, 1950 |
| 2,610,387 | Borland et al. | Sept. 16, 1952 |
| 2,648,797 | Werner | Aug. 11, 1953 |
| 2,704,879 | Diggle | Mar. 29, 1955 |
| 2,800,929 | Warner et al. | July 30, 1957 |
| 2,812,499 | Robertson | Nov. 5, 1957 |
| 2,909,200 | Miller et al. | Oct. 20, 1959 |

FOREIGN PATENTS

| | | |
|---|---|---|
| 744,815 | Great Britain | Feb. 15, 1956 |